United States Patent [19]
Franz

[11] 3,868,427

[45] Feb. 25, 1975

[54] DEHYDROCOUPLING PROCESS

[75] Inventor: Raymond A. Franz, Baton Rouge, La.

[73] Assignee: Monsanto Company, St. Louis, Mo.

[22] Filed: Oct. 19, 1973

[21] Appl. No.: 408,232

[52] U.S. Cl. ............................................ 260/668 C
[51] Int. Cl. .............................................. C07c 15/14
[58] Field of Search ................................. 260/668 C

[56] References Cited
UNITED STATES PATENTS
3,205,280   9/1965   Wattimena et al. ............ 260/680 D

*Primary Examiner*—C. Davis
*Attorney, Agent, or Firm*—Paul L. Passley

[57] ABSTRACT

A vapor phase for converting toluene and/or toluene derivatives in the presence of oxygen, an inert heat carrier material, a metal oxide and a halogen to stilbene and/or stilbene derivatives.

11 Claims, No Drawings

DEHYDROCOUPLING PROCESS

BACKGROUND OF THE INVENTION

This invention relates to the manufacture of 1,2-diphenylethylene (stilbene) and derivatives thereof.

Stilbene, because of its unsaturated character, is very reactive and may be employed in various organic syntheses. It is useful in the production of products which may be used in the manufacture of dyes, paints and resins. It is also useful in optical brighteners, in pharmaceuticals and as an organic intermediate.

Heretofore, stilbene has not been available in commercial quantities because the attendant yields of the known processes for the manufacture of stilbene have been generally small. Stilbene has been synthesized by dehydrogenation of bibenzyl; by dehydrogenation of 1,2-bis(3-cyclohexen-1-yl)ethylene (U.S. Pat. No. 3,387,050); and by reacting a benzyl mercaptan with a sulfactive catalyst, for example, molybdenum disulfide and copper sulfide (U.S. Pat. No. 2,645,671). Stilbene and halostilbenes have been synthesized by the iodative dehydrocoupling of toluene and halogen substituted toluenes with elemental iodine and molten lithium iodide at toluene conversions of 10–30% (U.S. Pat. No. 3,409,680).

In U.S. Pat. No. 3,205,280, a catalytic dehydrogenation process is disclosed wherein certain hydrocarbons are converted to less saturated hydrocarbons by heating a mixture of hydrocarbon with at least 0.001 mols of a halogen per mol of hydrocarbon in the presence of free oxygen and a solid catalyst of an alkali metal halide and silver halide and additionally oxides and halides of certain elements.

In U.S. Pat. No. 3,694,518, a dehydrocoupling process is disclosed wherein toluene is converted to stilbene by heating toluene with oxygen in the presence of iodine and, optionally, an inert heat carrier material.

SUMMARY

This invention is directed to vapor phase process for converting phenylmethane (toluene) to a 1,2-diphenylethylene (stilbene).

Accordingly, typical objects of this invention are to provide: (1) an improved vapor phase process for the production of stilbene and derivatives thereof and (2) a vapor phase dehydrocoupling process for converting toluene and toluene derivatives to stilbene and stilbene derivatives.

Other objects, aspects and advantages of this invention will become apparent to those skilled in the art upon further study of this disclosure and the appended claims.

In accordance with this invention toluene and toluene derivatives are dehydrocoupled in a one step process to stilbene and stilbene derivatives by a vapor phase reaction in the presence of oxygen, a halogen, and a metal oxide, preferably palladium oxide, coated on alpha alumina. The molar ratio of toluene and/or toluene derivative:oxygen is in the range of about 1:0.1 to 1:1 and preferably is in the range of about 1:0.3 to 1:0.7. The molar ratio of toluene and/or toluene derivative:halogen (measured as moles of $X_2$ where X is chlorine, bromine, iodine or mixtures thereof) is in the range of about 1:0.0001 to 1:0.015 and preferably is in the range of about 1:0.001 to 1:0.01. For example, where elemental iodine is employed 0.015 mol of $I_2$ will be the maximum added, where methyl iodine is employed 0.03 mol of $CH_3I$ will be the maximum added, where dichloroethane is employed 0.015 mol of $C_2H_4Cl_2$ will be the maximum added, and where trichloro-ethane is employed 0.010 mol of $C_2H_3Cl_3$ will be the maximum added.

Any source of oxygen, pure or in admixture with inerts, may be employed in the process of this invention. Air is a satisfactory source of oxygen for use in this invention.

The halogen employed in the process of this invention can be chlorine, bromine, iodine, or mixtures thereof. The selected halogen may be introduced as elemental halogen and/or halogen compounds, such as hydrogen halide, ammonium halide, organic halides or any halogen-containing compound which decomposes under the reaction conditions. useful organic halides in this invention are, for example, alkyl halides such as methyl chloride, methyl bromide, methyl iodide, the ethyl halides, the butyl halides, and the like; iodoform; and aromatic halides such as chlorobenzene, bromobenzene, iodobenzene, and the like. Any of the above halogens or halogen compounds may be employed in the invention individually or in mixtures of two or more. Elemental iodine is presently the preferred halogen for use in this invention.

As previously stated, the process of this invention is conducted in the presence of alpha alumina coated with metal oxides. Suitable metals, whose oxides are useful, are cerium, potassium, platinum, aluminum, tantalum, lead, tin, vanadium, tungsten, manganese, molybdenum, thorium, nickel and palladium. The quantity of metal oxide applied to the alpha alumina will generally fall within the range of 1 to 25 monolayers and preferably 5 to 10 monolayers.

As previously stated, the process of this invention is carried out as a vapor phase reaction. Accordingly, any apparatus of the type suitable for carrying out chemical reactions in the vapor phase may be employed for the practice of this invention. The reactor will contain a bed of or be packed with alpha alumina coated with the chosen metal oxide.

The process of this invention may be operated continuously or intermittently and is carried out at a temperature in the range from about 500°C. to about 750°C. Preferably, the reaction is conducted as a continuous operation and at a temperature in the range of from about 550°C. to about 650°C.

Pressures other than atmospheric may be employed in the process of this invention, however, it will generally be preferred to conduct the reaction at or near atmospheric pressure.

The reaction time for the process of this invention may be selected from a broad operable range which may vary from about 0.1 to about 60 seconds. The reaction time may be defined as the length of time in seconds which the reactant gases measured under reaction conditions are in contact in the reactor. Preferably, the reaction time will be within the range of 0.5 to 20 seconds.

The reactor employed may be brought to the desired reactor temperature before or after introduction of the vaporized reactants. Preferably, the feed materials are preheated, vaporized and generally thoroughly mixed prior to introducing them to the reactor.

The products of the reaction may be recovered from the effluent gas by any appropriate method and means known to the art and further elucidation here will be unnecessary duplication of the art. The unreacted toluene and/or toluene derivatives are recovered and recirculated to the process. Also, the halogen or halogen source is recovered and recirculated to the process.

In addition to the presence of toluene and/or toluene derivatives, oxygen and halogen in the process of this invention, any inert material such as nitrogen, helium, and the like may be present. Such inert materials may be introduced to the process alone or may be combined with the other materials as feed. Also, water or steam may be present during the reaction and may be introduced to the process alone or with the other materials as feed.

In another aspect of the invention, the introduction of oxygen to the process at staged intervals offers the advantage of attaining higher conversions of the toluene and/or toluene derivative feed and higher yields of stilbene and/or stilbene derivatives. The staging of oxygen to the process may be accomplished by employing a reactor having a plurality of inlet ports spaced along the length of the reactor or by introducing oxygen at time intervals during the reaction time.

DESCRIPTION OF PREFERRED EMBODIMENTS

The following Examples are given as illustrative of the invention and, as such, specifics set forth are not intended to be unduly considered limitations upon the scope of the invention. In Examples I–III, the reactor used is a tubular system fabricated from 96% quartz tubing. The tube has an outside diameter of 30 mm and a length of 49.5 centimeters. The tubular reactor unit is supported in a vertical tube furnace. A 6 millimeter outside diameter thermowell is located in the center of the reactor. Prior to entering the reactor, the reactants are vaporized and introduced into the upper portion, preheat section, of the reactor. The effluent gases from the reactor are chromatographically analyzed.

EXAMAPLE I

A mixture of toluene, oxygen, elemental iodine, nitrogen and water in a molar ratio of 1:0.5:0.005:0.5:3.0 is preheated and introduced into the preheater section of the reactor. The reactor is filled with a 10 mesh commercial alpha alumina packing material. The reactant gases pass through the reactor at a temperature of 575°C. and at such a rate to provide a reaction time of 2.5 seconds under a pressure of 740.5 millimeters of Hg. After 120 minutes of operation, chromatographic analysis of the effluent shows a toluene conversion of 30.0% with a stilbene yield of 68.7 weight percent.

EXAMPLE II

A palladium oxide coated commercial alpha alumina material containing 10 monolayers of PdO is prepared by dissolving 0.4292 grams of $PdCl_2$ in 40 ml. of water and 2 ml. of concentrate $HNO_3$. This solution is mixed with 282 grams of the alpha alumina and then dried in a vacuum oven at 125° C. The dried material is then heated first at 250° C. for 2 hours and then at 600° C. for 4 hours.

A feed mixture having the same composition and ratio as used in Example I is preheated and introduced into the reactor which is filled with the PdO coated alpha alumina material as prepared above. The feed mixture passes through the reactor at a temperature of 575° C. and at such a rate to provide a reaction time of 2.5 seconds, after 120 minutes of operation, chromatographic analysis of the effluent show a toluene conversion of 45.1% with a stilbene yield of 72.7 weight percent. Thus the presence of PdO on the alumina has resulted in a 50% relative gain in toluene conversion at no sacrifice in stilbene yield.

The commercial alpha alumina packing material used in the above Examples is Alundum having a typical chemical analysis of

| Component | Percent |
|---|---|
| $Al_2O_3$ | 84.7 |
| $SiO_2$ | 13.4 |
| $Fe_2O_3$ | 0.20 |
| $TiO_2$ | 0.30 |
| CaO | 0.02 |
| MgO | 0.04 |
| $Na_2O$ | 0.60 |
| $K_2O$ | 0.70 | and physical properties of
  Bulk density — 1.4 — 1.6 g/c.c.
  Apparent specific gravity — 3.3 — 3.6
  Packing density — 44 —48 lb./cu.ft.

From the foregoing Examples it is readily apparent to those skilled in the art that the presence of metal oxides in the above-described process exhibits excellent selectivity and yields of stilbene.

The reaction of this invention may be conducted in a fixed bed or fluidized bed and for any sufficient length of time to provide a desired conversion of the toluene or toluene derivatives. Generally, the best result of desired products will be obtained when the conversion of toluene or toluene derivatives is between 25 and 75 percent or higher.

It will be obvious to persons skilled in the art that various modifications may be made in the process as described in this application. Accordingly, it is intended that all such modifications which reasonably fall within the scope of the appended claims are included herein.

We claim:

1. The method of preparing 1,2-diphenylethylene and derivatives thereof which comprises contacting in the vapor phase at a temperature in the range of about 500° C. to about 750° C., a phenylmethane and oxygen in a molar ratio of about 0.1 to about 1.0 mol of oxygen per mol of the phenylmethane and at least one halogen in a molar ratio of up to 0.015 mol of halogen per mol of the phenylmethane in the presence of alpha alumina coated with 1 to 25 monolayers of a palladium oxide.

2. The method of claim 1 wherein said contacting is conducted for a period of from about 0.1 to about 60 seconds.

3. The method of claim 1 wherein said halogen is present as elemental iodine.

4. The method of claim 1 wherein said halogen is introduced as a volatile halogen compound.

5. The method of claim 4 wherein said volatile halogen compound is hydrogen iodide.

6. The method of claim 1 wherein said contacting is conducted until at least 25 percent conversion of said phenylmethane is obtained.

7. The method of claim 1 wherein air is used as the source of oxygen.

8. The method of claim 1 wherein said halogen is introduced as ammonium iodide.

9. The method of claim 1 wherein the oxygen is introduced into the reaction at spaced intervals of time.

10. The method of claim 1 wherein the oxygen is introduced into the reaction at spaced locations.

11. The method of claim 1 wherein said palladium oxide is present in a quantity of 5 to 10 monolayers.

* * * * *